United States Patent
Eder et al.

(10) Patent No.: US 10,339,367 B2
(45) Date of Patent: Jul. 2, 2019

(54) RECOGNIZING A FACE AND PROVIDING FEEDBACK ON THE FACE-RECOGNITION PROCESS

(71) Applicant: Microsoft Technology Licensing, LLC, Redmond, WA (US)

(72) Inventors: Brigitte Evelyn Eder, Seattle, WA (US); Aaron Naoyoshi Sheung Yan Woo, Bellevue, WA (US); Remi Wesley Ogundokun, Seattle, WA (US); Benjamin Alan Goosman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/199,287

(22) Filed: Jun. 30, 2016

(65) Prior Publication Data
US 2017/0286754 A1  Oct. 5, 2017

Related U.S. Application Data

(60) Provisional application No. 62/314,899, filed on Mar. 29, 2016.

(51) Int. Cl.
*G06K 9/00* (2006.01)
*H04N 5/232* (2006.01)
(Continued)

(52) U.S. Cl.
CPC ..... *G06K 9/00288* (2013.01); *G06K 9/00228* (2013.01); *G06K 9/00281* (2013.01);
(Continued)

(58) Field of Classification Search
None
See application file for complete search history.

(56) References Cited

U.S. PATENT DOCUMENTS 6,128,398 A   10/2000  Kuperstein et al.
6,633,655 B1  10/2003  Hong et al.
(Continued)

FOREIGN PATENT DOCUMENTS

CN  104346600 A  2/2015
EP  1291807       3/2003
(Continued)

OTHER PUBLICATIONS

Face Verification Using Local Graph Stucture (LGS). Eimad Abdu Abusham. 2014.*
(Continued)

*Primary Examiner* — Delomia L Gilliard

(57) ABSTRACT

One or more images including a user's face are captured, and at least one of these images is displayed to the user. These image(s) are used by a face-recognition algorithm to identify or recognize the face in the image(s). The face-recognition algorithm recognizes various features of the face and displays an indication of at least one of those features while performing the face-recognition algorithm. These indications of features can be, for example, dots displayed on the captured image. Additionally, an indication of progress of the face-recognition algorithm is displayed near the user's face. This indication of progress of the face-recognition algorithm can be, for example, a square or other geometric shape in which at least a portion of the user's face is located.

20 Claims, 11 Drawing Sheets

(51) Int. Cl.
*H04N 5/33* (2006.01)
*G06T 7/50* (2017.01)

(52) U.S. Cl.
CPC ............ *G06K 9/00912* (2013.01); *G06T 7/50* (2017.01); *H04N 5/23293* (2013.01); *H04N 5/33* (2013.01); *G06T 2207/30201* (2013.01)

(56) References Cited

U.S. PATENT DOCUMENTS

| | | | |
|---|---|---|---|
| 6,853,739 | B2 | 2/2005 | Kyle |
| 8,462,996 | B2 | 6/2013 | Moon et al. |
| 9,104,908 | B1 | 8/2015 | Rogers et al. |
| 9,147,117 | B1* | 9/2015 | Madhu ............... H04L 63/0861 |
| 2006/0126905 | A1 | 6/2006 | Loo |
| 2007/0258645 | A1* | 11/2007 | Gokturk ............ G06K 9/00288 |
| | | | 382/190 |
| 2011/0279453 | A1* | 11/2011 | Murphy ................. G06T 13/00 |
| | | | 345/420 |
| 2013/0215275 | A1 | 8/2013 | Berini et al. |
| 2013/0239040 | A1* | 9/2013 | Kaleta .................. G06F 3/0484 |
| | | | 715/772 |
| 2013/0251244 | A1* | 9/2013 | Wei .................... G06K 9/00281 |
| | | | 382/159 |
| 2013/0294642 | A1* | 11/2013 | Wang ............... G06F 17/30855 |
| | | | 382/103 |
| 2014/0176764 | A1* | 6/2014 | Nakamura ......... G06K 9/00308 |
| | | | 348/231.99 |
| 2016/0063335 | A1 | 3/2016 | Wang et al. |
| 2016/0328886 | A1* | 11/2016 | Tong ....................... G06T 13/40 |

FOREIGN PATENT DOCUMENTS

| | | | | |
|---|---|---|---|---|
| EP | 1291807 | A2 * | 3/2003 | ......... G06K 9/00288 |
| EP | 1696393 | | 8/2006 | |
| EP | 1696393 | A2 * | 8/2006 | ......... G06K 9/00288 |
| EP | 2602993 | A1 | 6/2013 | |

OTHER PUBLICATIONS

Kollreider, et al., "Verifying Liveness by Multiple Experts in Face Biometrics", In Proceedings of IEEE Computer Society Conference on Computer Vision and Pattern Recognition Workshops, Jun. 23, 2008, 6 pages.

Abusham, Eimad Abdu, "Face Verification Using Local Graph Stucture (LGS)", In Proceedings of International Symposium on Biometrics and Security Technologies, Aug. 26, 2014, pp. 79-83.

Balasuriya, Lalendra Sumitha, "Frontal View Human Face Detection and Recognition", In Thesis of Department of Statistics and Computer Science, University of Colombo, May 2010, 109 pages.

"International Search Report and Written Opinion", Application No. PCT/US2017/023932, dated Jun. 22, 2017, 10 pages.

* cited by examiner

RECOGNIZING A FACE AND PROVIDING FEEDBACK ON THE FACE-RECOGNITION PROCESS

RELATED APPLICATIONS

This application claims priority under 35 U.S.C. Section 119(e) to U.S. Provisional Application No. 62/314,899, filed Mar. 29, 2016 and titled "Recognizing A Face And Providing Feedback On The Face-Recognition Process", the entire disclosure of which is hereby incorporated by reference.

BACKGROUND

As computing technology has advanced, computers have become increasingly commonplace. Given the large amounts of data that can be stored on computers, and the access to various resources or functionality that computers provide, users oftentimes desire to protect their computers so that they cannot be used by others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an image of a face is obtained and a face-recognition algorithm that recognizes features of the face is commenced. In conjunction with recognizing a feature of the face, an indication of the feature is displayed on a rendering of the face. An indication of progress of the face-recognition algorithm is displayed near the rendering of the face.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
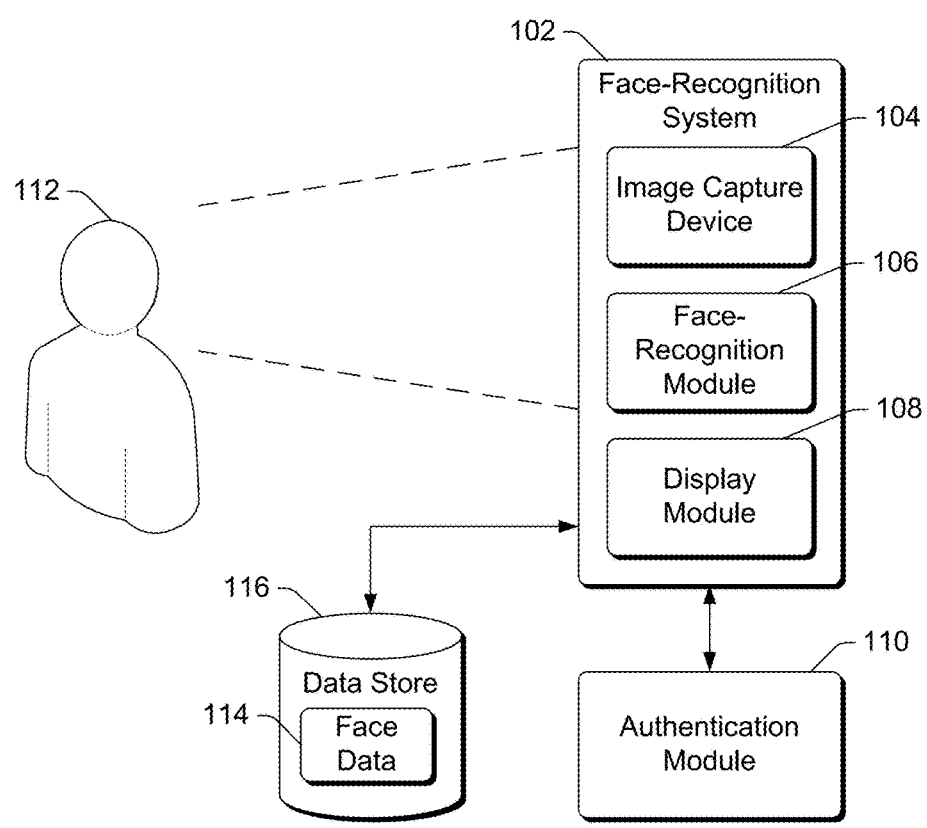
FIG. 1 illustrates an example system implementing the recognizing a face and providing feedback on the face-recognition process in accordance with one or more implementations.

Techniques for recognizing a face and providing feedback on the face-recognition process are described herein. A user can have his or her face identified and used by a computing device or system. The device or system can use the identified face as, for example, authentication or authorization to perform a particular task (e.g., log into a device or system, for payment of a bill or other transaction), a record of the user, and so forth.

One or more images including the user's face are captured, and the one or more images can be captured by multiple cameras or alternatively the same camera. At least one of these captured images is displayed to the user. The one or more captured images can be, for example, frames of video. These image(s) are used by a face-recognition algorithm to identify or recognize the face in the image(s). The images used by the face-recognition algorithm can be captured by a different camera than the images that are displayed to the user, or alternatively the images captured by a camera and displayed to the user can also be used by the face-recognition algorithm.

The face-recognition algorithm recognizes various features of the face and displays an indication of at least one of those features while performing the face-recognition algorithm. These indications of features can be, for example, dots displayed on the captured image. Additionally, an indication of progress of the face-recognition algorithm is displayed near the user's face. This indication of progress of the face-recognition algorithm can be, for example, the drawing of a square or other geometric shape in which at least a portion of the user's face is located, the filling in of a bounding box or other geometric shape in which at least a portion of the user's face is located, and so forth.

The techniques discussed herein provide feedback to a user as to the progress of the face-recognition algorithm and features of the user's face that are used by the face-recognition algorithm. This provides valuable feedback to the user that the face-recognition algorithm is operating, allowing the user to remain positioned appropriately and reducing the time taken to identify the user's face, and thus reduces energy usage and improves battery life for the computing device.

FIG. 1 illustrates an example system 100 implementing the recognizing a face and providing feedback on the face-recognition process in accordance with one or more implementations. System 100 includes a face-recognition system 102 that includes an image capture device 104, a face-recognition module 106, and a display module 108. The face-recognition system 102 can be implemented as a single computing device or across multiple computing devices. A variety of different types of devices can be used to implement the camera face-recognition system 102, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, watch, bracelet, head-mounted display), an entertainment device (e.g., an entertainment appliance, a set-top box communicatively coupled to a display device, a game console), a television or other display device, an automotive computer, an Internet of Things (IoT) device, and so forth.

The image capture device 104 can be any of a variety of different types of image capture devices capturing images in the visible light spectrum, infrared (IR) spectrum, and so forth. For example, the image capture device 104 can be an IR camera, an RGB (Red Green Blue) camera, and so forth. In one or more embodiments, the image capture device 104 includes both an IR camera and an RGB camera. Additionally or alternatively, the face-recognition system 102 can include multiple image capture devices 104, at least one of which includes an IR camera and at least another of which includes an RGB camera. The image capture device 104 can be a single-sensor camera or a stereoscopic camera, and can use various digital imaging technologies (e.g., charge-coupled devices (CCDs), complementary metal-oxide-semiconductor (CMOS) sensors, and so forth). The image capture device 104 also optionally includes (or has associated therewith for running on a different device) various software and/or firmware.

In one or more implementations, the image capture device 104 and the user face-recognition module 106 and display module 108 are implemented as part of the same device, such as part of a mobile device. Alternatively, the image capture device 104 and one or both of the user face-recognition module 106 and the display module 108 are implemented as separate devices. For example, the image capture device 104 can be implemented as part of a wearable device and the face-recognition module 106 and display module 108 can be implemented as part of mobile device, the image capture device 104 can be implemented as a standalone camera and the face-recognition module 106 and display module 108 can be implemented as part of a desktop device, the image capture device can be implemented as a standalone camera and the face-recognition module 106 can be implemented as a mobile or wearable device and the display module 108 can be implemented as a separate monitor or screen, and so forth. When implemented as separate devices, the devices implementing the image capture device 104, the face-recognition module 106, and/or the display module 108 can communicate with one another via a wired or wireless connection, such as a USB (universal serial bus) connection, a wireless USB connection, an infrared connection, a Bluetooth connection, a DisplayPort connection, a PCI (a peripheral component interconnect) Express connection, and so forth. The image capture device 104, the face-recognition module 106, and/or the display module 108 can alternatively or additionally be connected to one another via a data network, such as a personal area network.

In one or more embodiments, face-recognition system 102 is part of, or in communication with, an authentication module 110. Such an authentication module 110 can be used to restrict access to a particular device, resource, location, and so forth. For example, face-recognition system 102 can be used with an authentication module 110 that restricts which users can access (e.g., log into or unlock) a particular device, which users can access (e.g., enter) a particular building, which users can access (e.g., log into) a particular network, which users can access functionality of a particular device (e.g., a heating and cooling system), and so forth. Such an authentication module 110 can also restrict access to a particular service, such as a remote service (e.g., a Web site accessed via the Internet), a local payment terminal (e.g., at a brick and mortar store to authorize payment from an electronic wallet or other payment source). For example, a child using a computing device may send a request to a parent to buy an application or other item, and the authentication module 110 authenticates the parent in obtaining the parent's approval for the purchase. By way of another example, the child may hand his or her computing device to the parent, and an authentication module 110 on the computing device authenticates the parent in obtaining the parent's approval for the purchase.

The image capture device 104 captures multiple images each including at least part of the face of a user 112. In one or more embodiments, these multiple images are frames of video (e.g., captured at 30 frames per second). The images include various features of the user's face. A feature of the user's face refers to a characteristic of the user's face that can be used to differentiate users from one another. For example, features can be the location or size of at least part of an eye, the location or size of at least part of a nose, a location or pattern of at least part of a vein, a location or size of at least part of a scar (or other mark) on skin, measurements of various facial features (e.g., distances between facial features), and so forth. Various different features of the user can be analyzed by the authentication module 110 to authenticate the user 112, such as features of the user's face, features of the user's eye, features of the user's iris, and so forth.

The face-recognition module 106 uses one or more images captured by the image capture device 104 to recognize the face of the user 112. Recognizing the face of the user 112 refers to, for example, generating various data based on the features of the user's face that allows the user's face to be distinguished from faces of other people (e.g., other users). In one or more embodiments, the face-recognition module 106 uses a single image of the face of the user 112, although alternatively the face-recognition module 106 uses multiple images of the face of the user 112. The face-recognition module 106 implements any of a variety of different public and/or proprietary face-recognition algorithms to recognize the face of the user 112 as indicated in an image(s) captured by the image capture device 104. For example, face-recognition algorithms that can be used can be linear discriminate analysis algorithms, hidden Markov model algorithms, and so forth.

In one or more embodiments, the face-recognition module 102 stores face data 114 for the user 112 in a data store 116. The face data 114 for a user includes data regarding the features of that user's face and/or other settings or criteria used by the face-recognition module 106 in recognizing the face of the user 112, and which can be subsequently accessed and compared to detected features of a subsequent user (which may or may not be the same user as the user for which the face data 114 is stored) to determine whether the subsequent user is the user identified by the face data 114. Alternatively, rather than storing face data 114 in the data store 116, the authentication module 110 determines, based on the face recognized by the face-recognition module 106 and the face data 114, whether to authenticate the user.

The display module 108 displays the face of the user 112 (also discussed or referred to herein as the display module 108 rendering the face of the user 112). The display of the face of the user 112 can be, for example, at least one of the images captured by the image capture device 104. In one or more embodiments, the display module 108 displays the images in the same format as they are captured by the image capture device 104 (e.g., RGB captured images are displayed as RGB images by the display module 108). The display module 108 can display a single image captured by the image capture device 104 (e.g., a single image that is being used by the face-recognition module 106) or alternatively the display module 108 can display multiple images. For example, the image capture device 104 may capture video (e.g., 30 images or frames per second) of the user 112 and display module 108 can display the captured video. Regardless of how many images are displayed by the display module 108, the face-recognition module 106 can analyze multiple ones of the frames of captured video, or alternatively a single frame of captured video to recognize the face of the user 112. Thus, for example, the display module 108 may display video of the user 112 even though only a single frame or image of that video is used by the face-recognition module 106 to recognize the face of the user 112.

In one or more embodiments, the image capture device 104 includes two different types of cameras (e.g., an IR camera and an RGB camera). The one or more images captured by the IR camera are provided to the face-recognition module 106, which uses the IR images to recognize the face of the user. However, the one or more images captured by the RGB camera are provided to the display module 108 for display to the user (e.g., for rendering the face of the user).

The display module 108 also displays indications of features of the face of the user 112 being used by the face-recognition module 106. An indication of the locations of the features of the face being used by the face-recognition module 106 can be obtained by the display module 108 in different manners, such as from the face-recognition module 106. The features used by the face-recognition module 106 can be the same for different users, or different features (or combinations of features) can be used for different users. In one or more embodiments, the indications displayed by the display module 108 are dots (e.g., small squares, circles, or other geometric shapes overlaying the features). For example, the display module 108 can display an indication of the features on a rendering of the face of the user 112 by displaying one or more dots on the rendering of the face next to (e.g., within a threshold distance of) at least one of an eye of the face of the user, a nose of the face of the user, a mouth of the face of the user, and so forth.

Additionally or alternatively, the indications of features displayed by the display module 108 can take other forms, such as a change in the brightness or color of the feature (e.g., increasing the brightness of the locations of a screen or display device where the feature of the face of the user 112 is displayed), an outline of the feature (e.g., displaying a line or geometric shape substantially or at least partially surrounding the feature), and so forth.

Additionally or alternatively, the indications of features displayed by the display module 108 can be a graph that substantially covers the user's face as displayed by the display module 108. The graph substantially covering the user's face comprises the graph covering at least a threshold percentage (e.g., 75% or 80%) of the user's face. The graph can be a square, rectangle, ellipse, circle, or other geometric shape. The graph has multiple interior lines, also referred to as a grid. In one or more embodiments, at the beginning of the face-recognition module 106 performing the face-recognition, the indication of features displayed by the display module 108 is a graph that substantially covers the user's face. As individual features in the user's face are identified by the face-recognition module 106, the display module ceases displaying the graph and begins displaying dots next to (and/or overlaying) individual features of the user's face. The transition from displaying the graph to displaying the dots can be abrupt or a smooth transition (e.g., the graph can fade out and/or the dots can fade in). Thus, while the user's face is displayed, the display module 108 transitions from displaying the graph to displaying the dots next to (and/or overlaying) individual features of the user's face.

In one or more embodiments, in situations in which the face-recognition module 106 recognizes the face of a user from one or more images captured by a first type of camera (e.g., an IR camera) and the display module 108 displays one or more images captured by a second type of camera (e.g., an RGB camera), a translation is made by the face-recognition system 102 (e.g., by the face-recognition module 106 and/or the display module 108) from the first type of camera to the second type of camera. Because two different types of cameras are used in this situation, the captured images are of slightly different areas (e.g., due to the cameras being pointed in directions that differ by a few degrees, due to the cameras being situated in different locations (e.g., which may be several inches apart), etc.). The translation accounts for this, allowing the face-recognition system 102 to know which pixels captured by the first type of camera correspond to which pixels of the second type of camera. For example, the face-recognition system 102 can readily determine a set of pixels in an image captured by the first type of camera correspond to a particular feature (e.g., a corner of the user's mouth), and use the translation to determine which pixels of an image captured by the second type of camera correspond to the set of pixels in the image captured by the first type of camera, and thus which pixels in the image captured by the second type of camera correspond to the particular feature (e.g., a corner of the user's mouth).

This translation can be performed using any of a variety of public and/or proprietary techniques. In one or more embodiments, this translation is performed by normalizing the locations in the image captured by the first type of camera. The locations of features in the image captured by the first type of camera are normalized, and the corresponding locations in the image captured by the second type of camera and displayed by the face-recognition system 102 (e.g., by the display module 108) are determined by multiplying the normalized locations by the width and height of the frame or display area in which the image captured by the second type of camera is displayed. This multiplication results in x, y coordinates of the locations, in the image captured by the second type of camera and displayed by the face-recognition system 102, of the indications of features of the face of the user 112 being used by the face-recognition module 106.

The face-recognition system 102 (e.g., the display module 108) provides various feedback to the user regarding the progress made by the face-recognition module 106 in recognizing the face of the user 112. This feedback lets the user 112 know that the face recognition progress is in-process and that the face-recognition module 106 is working on it. This feedback also lets the user 112 know at least some of the information regarding the user that the face-recognition system 102 is relying on. For example, a rectangle, square, or other geometric shape is displayed approximately (e.g., within a threshold number of pixels of) the display of the user's face, informing the user of the area in the image(s) that the face-recognition system 102 is using as the user's face. By way of another example, indications of features of the face of the user 112 being used by the face-recognition module 106 are displayed, letting the user know where the face-recognition system 102 has identified various features of the user's face (e.g., the user's mouth, eyes, etc.).

Figure 2:
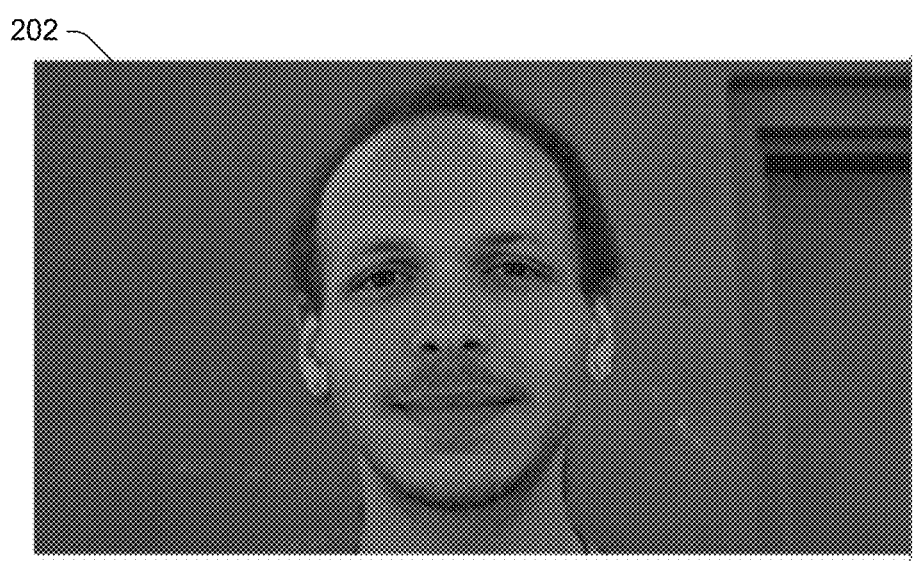
FIGS. 2, 3, 4, 5, 6, 7, 8, and 9 illustrate examples of displays of the face of the user by the display module in accordance with one or more embodiments.

FIGS. 2-9 illustrate examples of displays of the face of the user by the display module 108 in accordance with one or more embodiments. Various different additional information, such as indications of features used by the face-recognition algorithm and/or the progress of the face-recognition algorithm, is also displayed as discussed with reference to the individual ones of FIGS. 2-9. FIGS. 2-9 are discussed with additional reference to elements of FIG. 1. In one or more embodiments, FIGS. 2-8 illustrate the progression of various indications displayed by the display module while the face-recognition module 106 is recognizing the face of the user. The order of progression is the order of the FIG. numbers, so the display of FIG. 2 is displayed first, then the display of FIG. 3, then the display of FIG. 4, and so forth.

It should be noted, however, that the displays in FIGS. 2-8 are not exhaustive—multiple additional displays may be displayed in between any two of FIGS. 2-8.

FIG. 2 illustrates an example display 202 of the face of the user. The display 202 is, for example, an image of the user captured by the image capture device 104.

Figure 3:
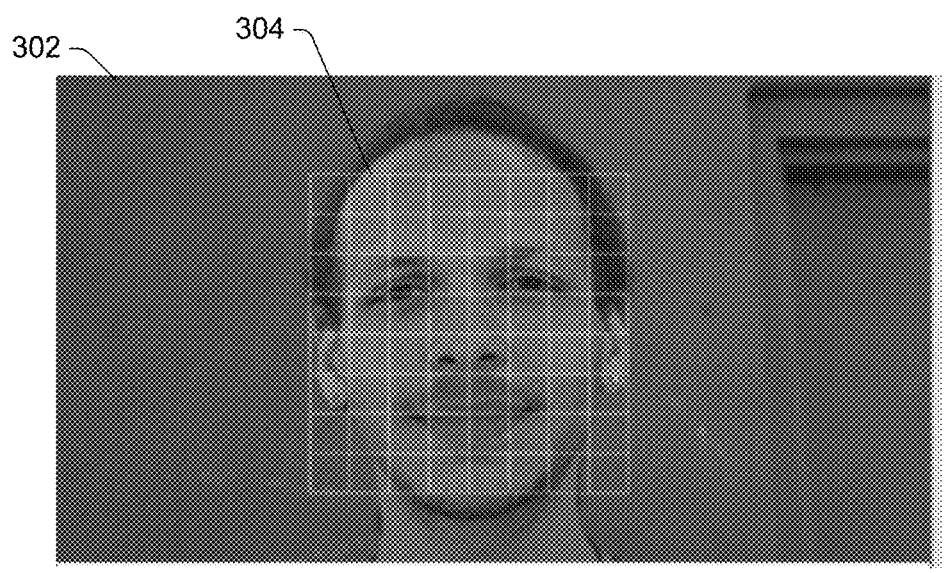

FIG. 3 illustrates an example display 302 of the face of the user, the display 302 including a graph 304 that substantially covers the user's face. As illustrated in FIG. 3, the graph 304 is a square with interior grid lines. In one or more embodiments, the display 302 is displayed after the display 202 is displayed and after the face-recognition module 106 has identified an approximate boundary of the user's face. In one or more embodiments, display of the graph 304 provides an indication to the user that an approximate boundary of his or her face has been identified by the face-recognition module 106, and optionally that identification of features within the user's face will begin (or has recently begin).

Figure 4:
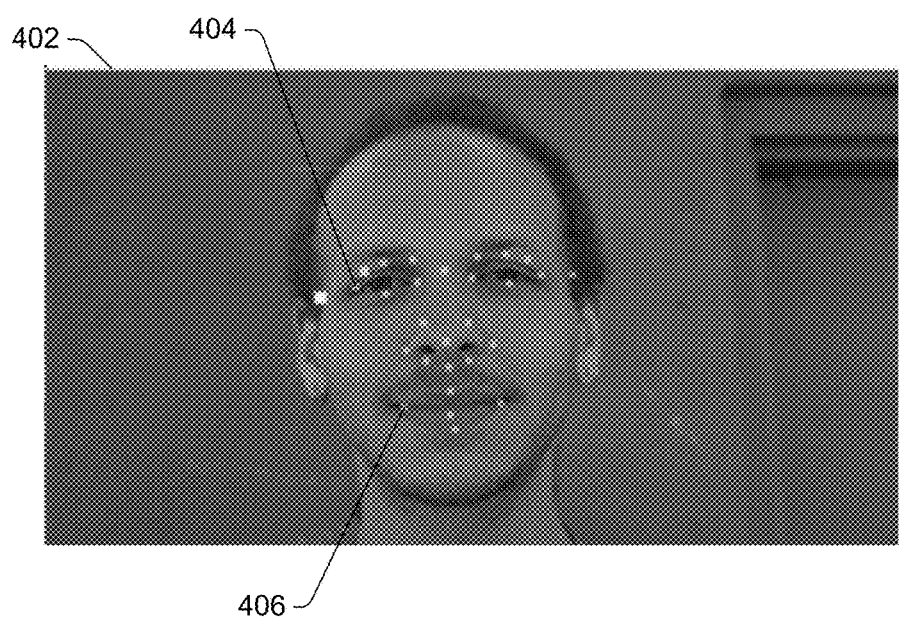

FIG. 4 illustrates an example display 402 of the face of the user, the display 402 including multiple indications of features used by the face-recognition module 106. These indications of features are illustrated as dots, such as dot 404 (at the corner of the user's eye) and dot 406 (at the corner of the user's mouth). As illustrated in FIG. 4, the dots can be the same or different sizes, and can be the same or different brightnesses (or intensities). Also as illustrated in FIG. 4, the graph 304 of FIG. 3 is also no longer displayed (or is being faded out). In one or more embodiments, the display 402 is displayed after the display 302 is displayed and after the face-recognition module 106 has identified at least a threshold number (e.g., at least one) feature of the user's face. In one or more embodiments, display of the dots and/or ceasing display of the graph 304 provides an indication to the user that one or more features of the user's face have been identified and recognition of the user based on those features will begin (or has recently begin).

Returning to FIG. 1, in one or more embodiments the display module 108 varies the display of the indications of features (e.g., the dots in FIG. 4) over time. This variance can be a change in size, brightness, intensity, color, and so forth of the displayed indications. In one or more embodiments, the display of the indications of features varies so as to appear to be moving or passing over the face of the user.

The display module 108 also displays, concurrently with the display of one or more images of the face of the user 112, an indication of progress of the face-recognition module 106. This indication is displayed near (e.g., within a threshold distance of) the face of the user being displayed by the display module 108. An indication of an amount of time that the face-recognition module 106 is expected to take to recognize the face of the user 112 is obtained by the display module 108, and the display module 108 uses this indication of the amount of time to update the indication of progress of the face-recognition module 106.

The amount of time that the face-recognition module 106 is expected to take to recognize the face of the user 112 can be determined in a variety of different manners. In one or more embodiments, the face-recognition module 106 and/or display module 108 is configured with the amount of time (e.g., an average amount of time that the face-recognition module 106 takes as determined by the developer or designer of the face-recognition module 106). Additionally or alternatively, the face-recognition module 106 can dynamically determine the expected amount of time to recognize the face of the user 112 based on various different criteria (e.g., an amount of time that the face-recognition module 106 takes to identify the features of the face of the user 112, a number and/or type of features of the face of the user 112 that have been identified by the face-recognition module 106, etc.) and provide the determined expected amount of time to the display module 108.

The display module 108 displays an indication of progress of the face-recognition module 106 based on the expected amount of time to recognize the face of the user 112 and an amount of time that has elapsed since face-recognition of the user's face began (e.g., as indicated to the display module 108 by the face-recognition module 106). In one or more embodiments, the indication is a line, bar, or other object that is filled or completed as the face-recognition progresses. This completing or filing can be performed approximately linearly (e.g., within a threshold amount of being linear), so that when the recognition of the face of the user is 10% done the line, bar, or other object is 10% filled or completed, when the recognition of the face of the user is 40% done the line, bar, or other object is 40% filled or completed, when the recognition of the face of the user is 80% done the line, bar, or other object is 80% filled or completed, and so forth.

Additionally or alternatively, the face-recognition module 106 can provide to the display module 108 indications of the progress of the face-recognition module 106 as the face-recognition module 106 progresses to recognize the face of the user. For example, the face-recognition module 106 may provide an indication to the display module 108 when the face-recognition module 106 is 10% done, when the face-recognition module 106 is 15% done, when the face-recognition module 106 is 20% done, and so forth.

In one or more embodiments, the display module 108 displays the indication of progress of the face-recognition module 106 near (e.g., within a threshold distance of) the user's face as displayed by the display module 108. In one or more embodiments, the indication of programs of the face-recognition module 106 is a square or other geometric shape (e.g., rectangle, oval, etc.) in which at least a portion of the face of the user is located, such as a portion that substantially surrounds the user's face (e.g., surrounding at least a threshold percentage (e.g., 75% or 80%) of the user's face). This square or other geometric shape can be, for example, the edges (e.g., perimeter) of the graph that substantially covers the user's face (e.g., the graph 304 of FIG. 3).

Figure 5:
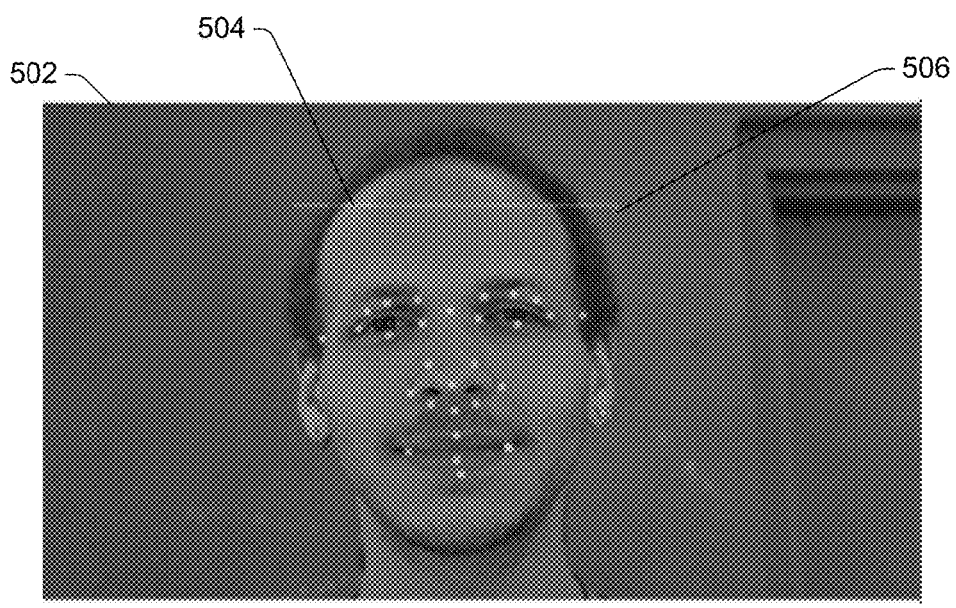

FIG. 5 illustrates an example display 502 of the face of the user. The display 502 includes both multiple indications of features used by the face-recognition module 106, and an indication of the progress of the face-recognition module 106. The indications of features are illustrated as dots (e.g., as discussed above with respect to FIG. 4). As illustrated in FIG. 5, the graph 304 of FIG. 3 is also no longer displayed. Also as illustrated in FIG. 5, the indication of progress of the face-recognition module 106 is displayed as a square near the face of the user. One edge 504 and part 506 of another edge of the square is illustrated in FIG. 5, indicating that the progress of the face-recognition module 106 is a little more than 25% done. In one or more embodiments, the display 502 is displayed after the display 402 is displayed and after the face-recognition module 106 has started the face recognition process given the identified features (e.g., as indicated by the displayed dots).

Figure 6:
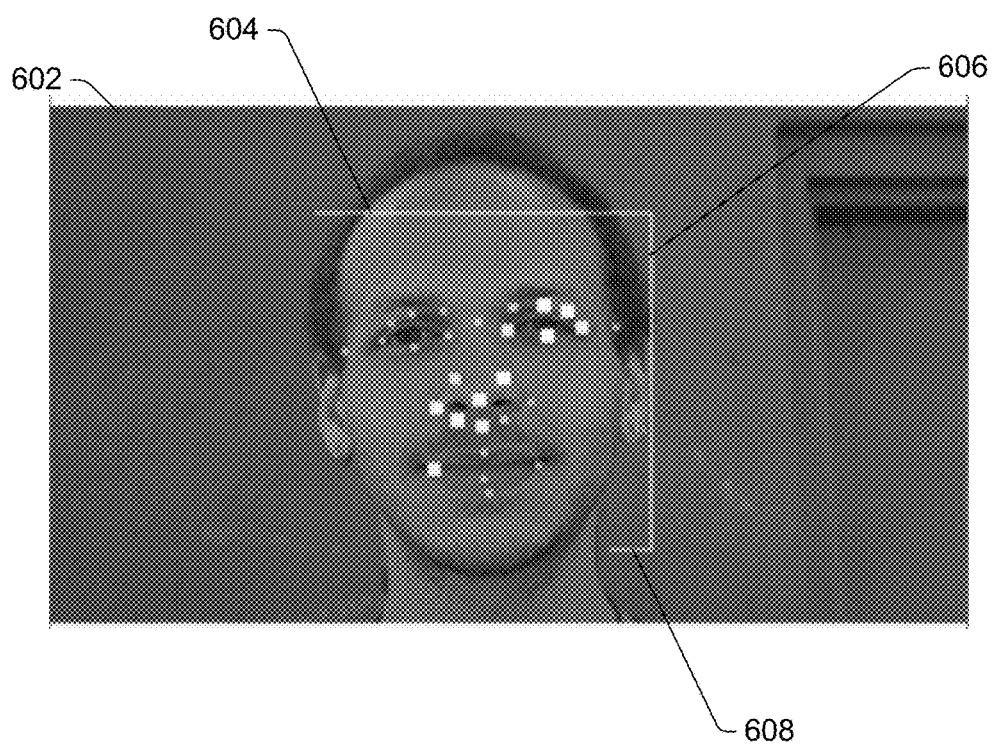

FIG. 6 illustrates an example display 602 of the face of the user. The display 602 includes both multiple indications of features used by the face-recognition module 106, and an indication of the progress of the face-recognition module 106. The indications of features are illustrated as dots (e.g., as discussed above with respect to FIG. 4). As illustrated in FIG. 6, the indication of progress of the face-recognition module 106 is displayed as a square near the face of the user. Two edges 604 and 606 and part 608 of another edge of the square are illustrated in FIG. 6, indicating that the progress of the face-recognition module 106 is a little more than 50% done. In one or more embodiments, the display 602 is displayed after the display 502 is displayed and the face-recognition module 106 progressed in recognizing the face of the user.

Figure 7:
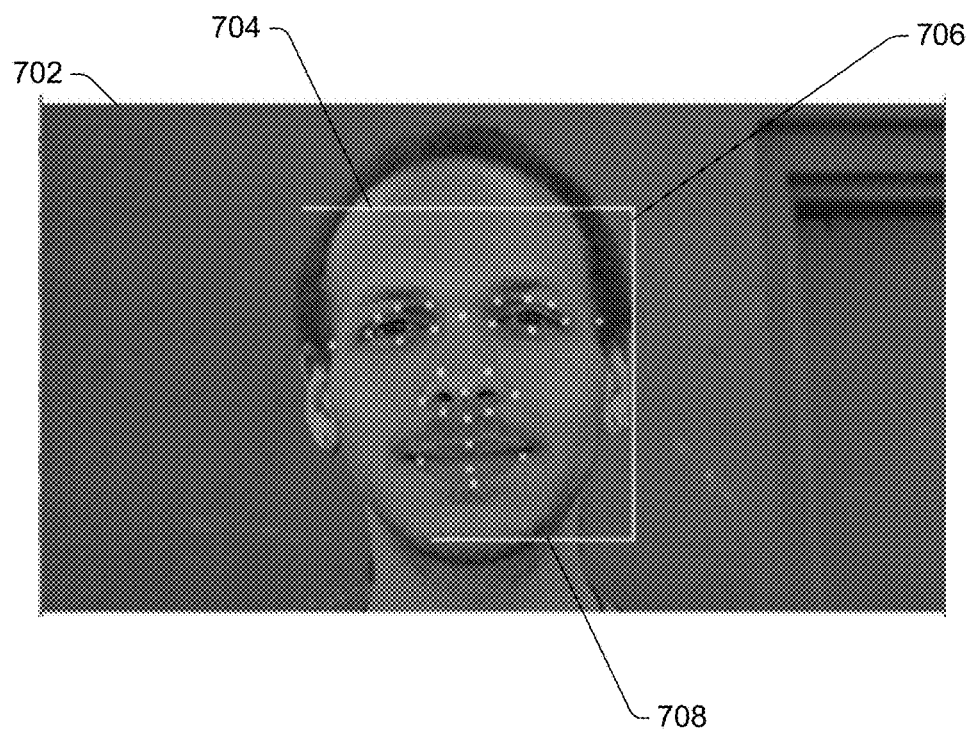

FIG. 7 illustrates an example display 702 of the face of the user. The display 702 includes both multiple indications of features used by the face-recognition module 106, and an indication of the progress of the face-recognition module 106. The indications of features are illustrated as dots (e.g., as discussed above with respect to FIG. 4). As illustrated in FIG. 7, the indication of progress of the face-recognition module 106 is displayed as a square near the face of the user. Two edges 704 and 706 and part 708 of another edge of the square are illustrated in FIG. 7, indicating that the progress of the face-recognition module 106 is approximately 65% done. In one or more embodiments, the display 702 is displayed after the display 602 is displayed and the face-recognition module 106 progressed in recognizing the face of the user.

Figure 8:
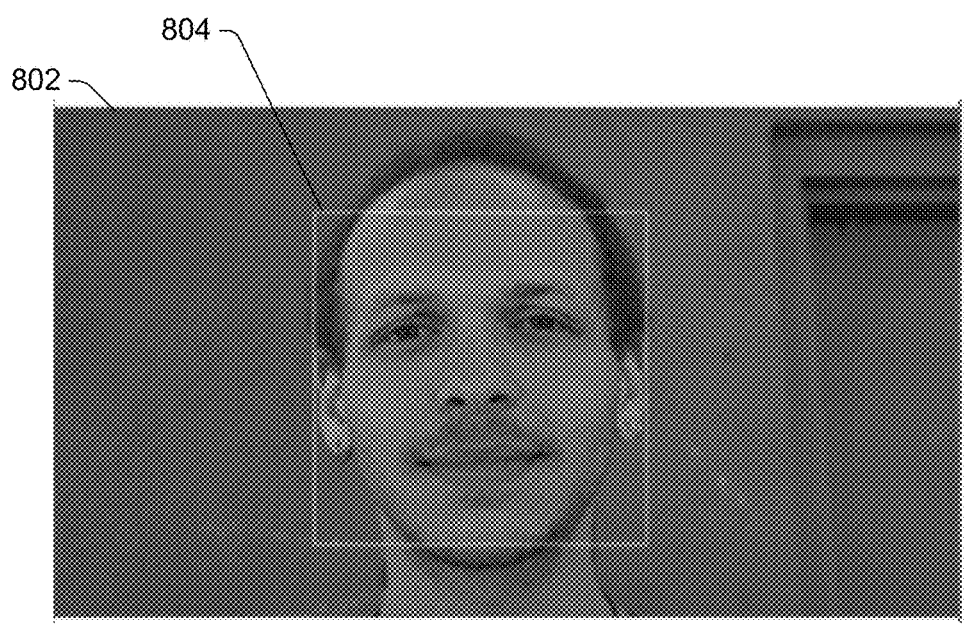

FIG. 8 illustrates an example display 802 of the face of the user. The display 802 includes an indication of the progress of the face-recognition module 106. As illustrated in FIG. 8, the indication of progress of the face-recognition module 106 is displayed as a square near the face of the user. The square is illustrated as completed (e.g., all four edges have been drawn or displayed), indicating that the progress of the face-recognition module 106 is done. In one or more embodiments, the display 802 is displayed after the display 702 is displayed and the face-recognition module 106 has completed recognizing the face of the user. The indications of features used by the face-recognition module 106 are not included in the display 802, providing further indication that the face-recognition module 106 has completed recognizing the face of the user.

It should be noted that although illustrated as a square surrounding at least part of the user's face, the indication of the progress of the face-recognition module 106 can be displayed in other manners. For example, a geometric shape other than the square can be displayed. By way of another example, a vertical or horizontal bar near (e.g., within a threshold distance of) the user's face as displayed by the display module 108 can be filled or completed. Such a vertical or horizontal bar may be adjacent to a side, top, or bottom of the user's face, may be displayed across the user's face, and so forth. By way of another example, rather than drawing the geometric shape as the face-recognition module 106 progresses with recognizing the face, the geometric shape can be fully drawn with the edges being hollow, and then the edges are filled in to show the progress made by the face-recognition module 106.

Figure 9:
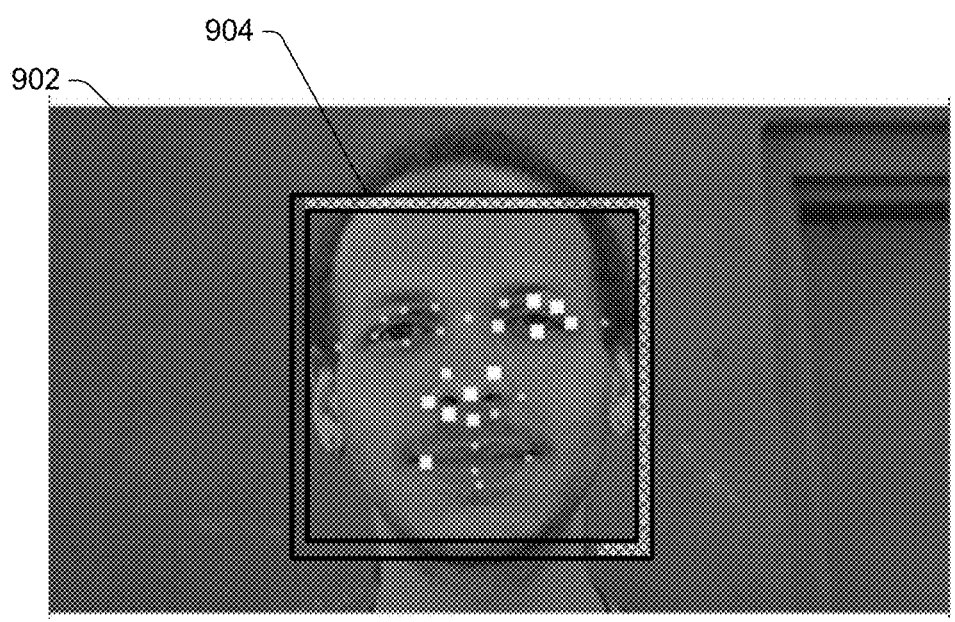

For example, FIG. 9 illustrates an example display 902 of the face of the user. The display 902 includes both multiple indications of features used by the face-recognition module 106, and an indication of the progress of the face-recognition module 106. The indications of features are illustrated as dots (e.g., as discussed above with respect to FIG. 4). The display 902 is similar to the display 602 of FIG. 6, except that the indication of progress of the face recognition module 106 is displayed as a bounding box with an opaque progress bar drawing over it, the bounding box being filled as the face-recognition module 106 progresses with recognizing the face.

As illustrated in FIG. 9, the indication of progress of the face-recognition module 106 is displayed as a bounding box 904 near the face of the user. The bounding box is filled in (shown by hash marks) a little more than 50%, indicating that the progress of the face-recognition module 106 is a little more than 50% done. The bounding box 904 being completely filled in indicates that the face-recognition module 106 has finished the face recognition process. Thus, rather than a box or other geometric shape that is drawn around the face of the user to show the indication of the progress of the face-recognition module 106 as shown in FIGS. 5-8, the indication of the progress of the face-recognition module 106 can be shown by filling in the opaque progress bar.

In the illustrated examples of FIGS. 2-9, individual images are shown. It should be noted, however, that rather than displaying a single image of the user, the display module 108 can display multiple images (e.g., frames of video) as the user's face is being recognized. The graph (as shown in FIG. 3), the indications of features (e.g., dots as shown in FIG. 4), and the indication of progress (e.g., the square being drawn around the user's face or the bounding box being filled in) are displayed on the individual ones of the multiple images (e.g., individual frames of the video). If the user 112 moves during the face recognition process, the display module updates the location of the graph, the indications of features, and the indication of progress correspondingly as appropriate so that the graph continues to substantially cover the user's face, the indications of features continue to be displayed at the locations where those features are displayed in the one or more images, and the indication of progress continues to be displayed near the face of the user.

In the discussion herein, reference is made to recognizing a face of a user. It should be noted that the techniques discussed herein can be applied analogously to recognize, in addition to or in place of recognizing a face of a user, other objects or characteristics of a user. For example, the techniques discussed herein can be used to recognize the eye or iris of a user, and display indications of features of the eye or iris as well as displaying an indication of progress of recognition of the eye or iris. By way of another example, the techniques discussed herein can be used to recognize the fingerprint or handprint of a user, and display indications of features of the fingerprint or handprint as well as displaying an indication of progress of recognition of the fingerprint or handprint.

Figure 10:
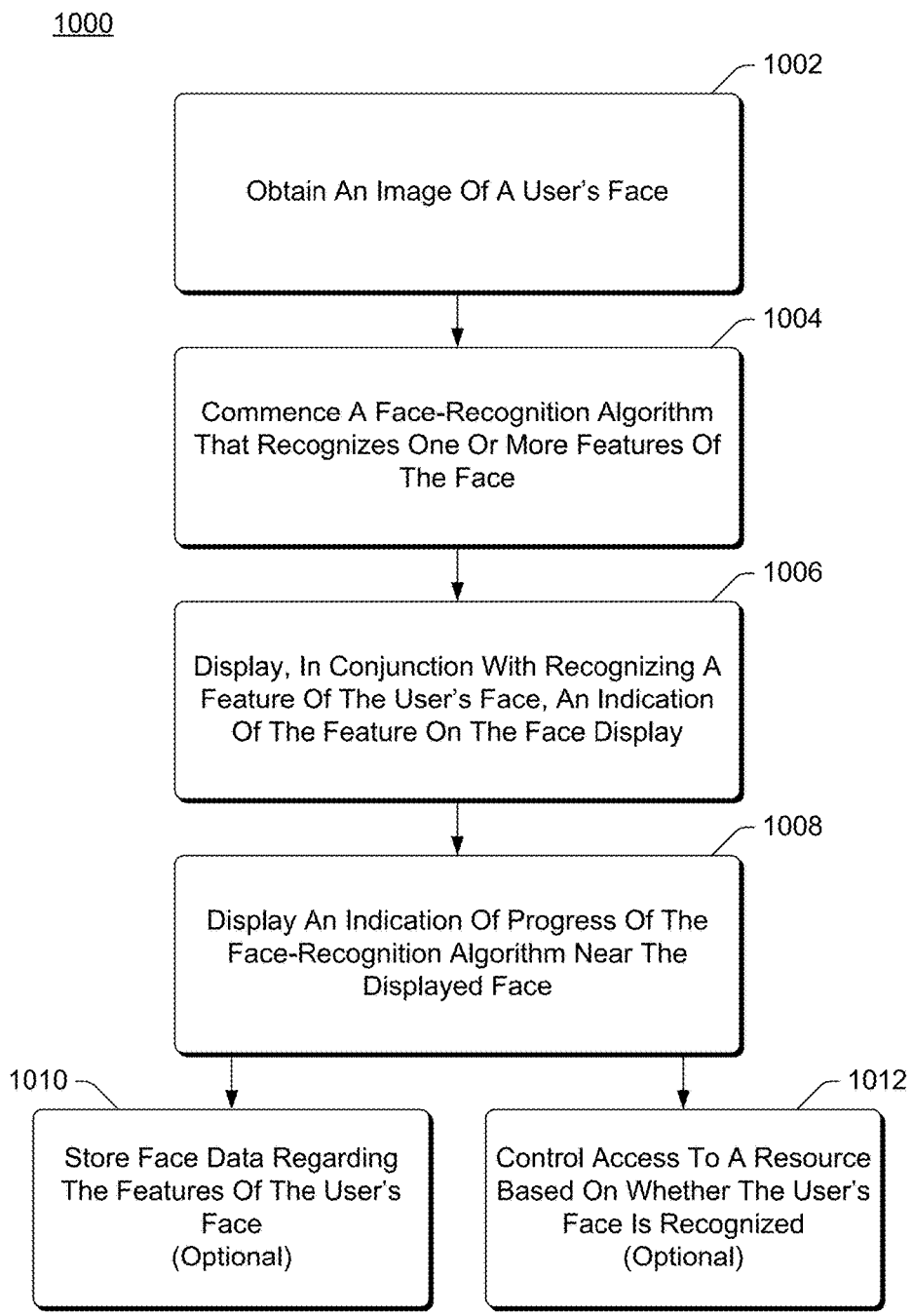
FIG. 10 is a flowchart illustrating an example process for recognizing a face and providing feedback on the face-recognition process in accordance with one or more implementations.

FIG. 10 is a flowchart illustrating an example process 1000 for recognizing a face and providing feedback on the face-recognition process in accordance with one or more implementations. Process 1000 is carried out by a face-recognition system, such as face-recognition system 102 of FIG. 1, and can be implemented in software, firmware, hardware, or combinations thereof. Process 1000 is shown as a set of acts and is not limited to the order shown for performing the operations of the various acts. Process 1000 is an example process for recognizing a face and providing feedback on the face-recognition process; additional discussions of recognizing a face and providing feedback on the face-recognition process are included herein with reference to different figures.

In process 1000, an image of a user's face is obtained (act 1002). The image is captured by one or more of various different image capture devices as discussed above.

A face-recognition algorithm that recognizes one or more features of the face is commended (act 1004). The face-recognition algorithm is implemented by, for example, the face-recognition module 106 of FIG. 1. Various different features of the user's face can be recognized as discussed above. A graph that substantially covers the user's face is also displayed in act 1004 (e.g., in response to an approximate boundary of the user's face being identified).

In conjunction with recognizing a feature of the user's face, an indication of the feature is displayed on a display or rendering of the face (act 1006). The user's face is displayed as discussed above, and various indications of the features in the face can be displayed (e.g., dots) overlaying or adjacent to the features are displayed. In one or more embodiments, this display or rendering of the face is the display or rendering of images captured by one type of camera (e.g., an RGB camera) that is different than the type of camera (e.g., an IR camera) being used to capture images that are analyzed by the face-recognition algorithm.

An indication of the progress of the face-recognition algorithm is also displayed near the displayed face (act 1008). The indication of the progress of the face-recognition algorithm can be displayed in various manners as discussed above, such as edges of a square in which at least a portion of the user's face is located.

Face data regarding the features of the user's face is optionally stored in a data store (act 1010). This face data can be subsequently used to authenticate or recognize the user at a later time.

Access to a resource is optionally controlled based on whether the user's face is recognized (e.g., authenticated) (act 1012). This resource can be, for example, a computing device on which the face-recognition system is implemented, another device or service, and so forth. Additionally or alternatively, actions other than controlling access to a resource can be performed, such as storing a maintaining a record of the user's face.

Although particular functionality is discussed herein with reference to particular modules, it should be noted that the functionality of individual modules discussed herein can be separated into multiple modules, and/or at least some functionality of multiple modules can be combined into a single module.

Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
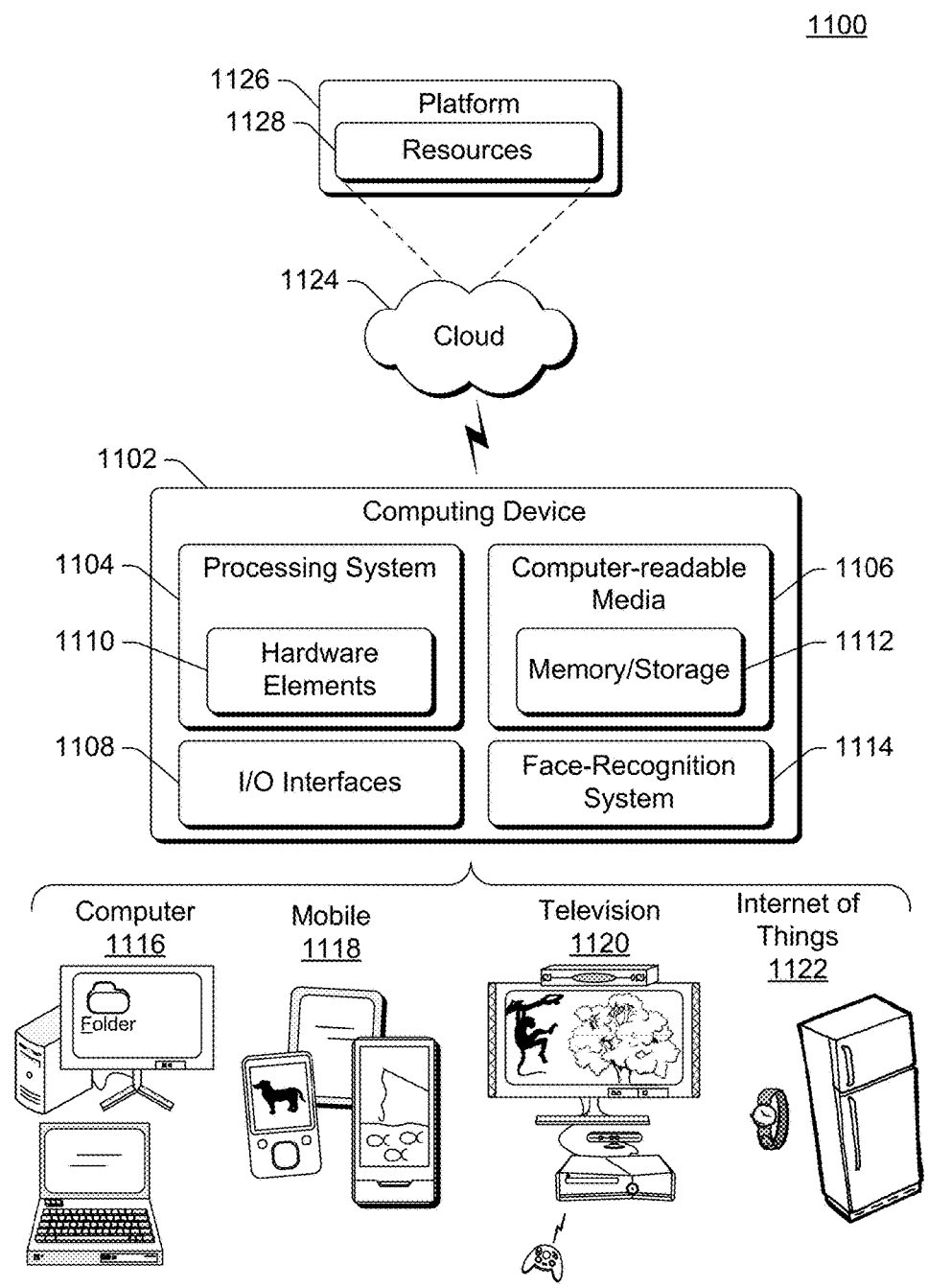
FIG. 11 illustrates an example system generally that includes an example computing device that is representative of one or more systems and/or devices that may implement the various techniques described herein.

FIG. 11 illustrates an example system generally at 1100 that includes an example computing device 1102 that is representative of one or more systems and/or devices that may implement the various techniques described herein. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O Interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage 1112. The memory/storage 1112 represents memory/storage capacity associated with one or more computer-readable media. The memory/storage 1112 may include volatile media (such as random access memory (RAM)) and/or nonvolatile media (such as read only memory (ROM), Flash memory, optical disks, magnetic disks, and so forth). The memory/storage 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

The one or more input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1102 may be configured in a variety of ways as further described below to support user interaction.

The computing device 1102 also includes a face-recognition system 1114. The face-recognition system 1114 provides various functionality for recognizing a face and providing feedback on the face-recognition process as discussed above. The face-recognition system 1114 can be, for example, the face-recognition system 102 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1110 and computer-readable media 1106 are representative of instructions, modules, programmable device logic and/or fixed device logic implemented in a hardware form that may be employed in some implementations to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of modules as a module that is executable by the computing device 1102 as software may be achieved at least partially in hardware, e.g., through use of computer-readable storage media and/or hardware elements 1110 of the processing system. The instructions and/or functions may be executable/operable by one or more articles of manufacture (for example, one or more computing devices 1102 and/or processing systems 1104) to implement techniques, modules, and examples described herein.

As further illustrated in FIG. 11, the example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one or more implementations, the central computing device may be a cloud of one or more server computers that are connected to the multiple devices through a network, the Internet, or other data communication link.

In one or more implementations, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more implementations, a class of target devices is created and experiences are tailored to the generic class of devices. A class of devices may be defined by physical features, types of usage, or other common characteristics of the devices.

In various implementations, the computing device 1102 may assume a variety of different configurations, such as for computer 1116, mobile 1118, television 1120, and IoT 1122 uses. Each of these configurations includes devices that may have generally different constructs and capabilities, and thus the computing device 1102 may be configured according to one or more of the different device classes. For instance, the computing device 1102 may be implemented as the computer 1116 class of a device that includes a personal computer, desktop computer, a multi-screen computer, laptop computer, netbook, and so on.

The computing device 1102 may also be implemented as the mobile 1118 class of device that includes mobile devices, such as a mobile phone, portable music player, portable gaming device, a tablet computer, a multi-screen computer, a watch or bracelet, devices without screens, and so on. The computing device 1102 may also be implemented as the television 1120 class of device that includes devices having or connected to generally larger screens in casual viewing environments. These devices include televisions, set-top boxes, gaming consoles, and so on. The computing device 1102 may also be implemented as the IoT 1122 class of device, such as a household appliance, a heating and cooling control device, a security system device, and so on.

The techniques described herein may be supported by these various configurations of the computing device 1102 and are not limited to the specific examples of the techniques described herein. This functionality may also be implemented all or in part through use of a distributed system, such as over a "cloud" 1124 via a platform 1126 as described below.

The cloud 1124 includes and/or is representative of a platform 1126 for resources 1128. The platform 1126 abstracts underlying functionality of hardware (e.g., servers) and software resources of the cloud 1124. The resources 1128 may include applications and/or data that can be utilized while computer processing is executed on servers that are remote from the computing device 1102. Resources 1128 can also include services provided over the Internet and/or through a subscriber network, such as a cellular or Wi-Fi network.

The platform 1126 may abstract resources and functions to connect the computing device 1102 with other computing devices. The platform 1126 may also serve to abstract scaling of resources to provide a corresponding level of scale to encountered demand for the resources 1128 that are implemented via the platform 1126. Accordingly, in an interconnected device implementations, implementation of functionality described herein may be distributed throughout the system 1100. For example, the functionality may be implemented in part on the computing device 1102 as well as via the platform 1126 that abstracts the functionality of the cloud 1124.

In the discussions herein, various different implementations are described. It is to be appreciated and understood that each implementation described herein can be used on its own or in connection with one or more other implementations described herein. Any of the devices, methods, and so forth discussed herein can be used in conjunction with any other devices, methods, and so forth discussed herein. Further aspects of the techniques discussed herein relate to one or more of the following implementations.

A method comprising: obtaining an image of a face; commencing a face-recognition algorithm that recognizes features of the face; in conjunction with recognizing a feature of the face, displaying an indication of the feature on a rendering of the face; and displaying an indication of progress of the face-recognition algorithm near the rendering of the face.

Alternatively or in addition to any of the above described methods, any one or combination of: wherein obtaining the image comprises obtaining the image via an infra-red camera; wherein obtaining the image comprises obtaining the image via an RGB camera; wherein displaying an indication of progress of the face-recognition algorithm comprises rendering edges of a square in which at least a portion of the face is located; wherein displaying an indication of progress of the face-recognition algorithm comprises filling in edges of a rectangle around at least a portion of the face; wherein displaying an indication of the feature on a rendering of the face comprises displaying a graph that substantially covers the face in the rendering of the face; wherein displaying an indication of the feature on a rendering of the face comprises displaying one or more dots on the rendering of the face next to at least one of: an eye, a nose, or a mouth of the face; wherein obtaining the image of the face comprises obtaining a video including the face, and wherein rendering of the face comprises playing back the video while the face-recognition algorithm recognizes features of the face.

A system comprising: an image capture device configured to obtain an image of a face of a user of the system; a face-recognition module configured to recognize features of the face; and a display module configured to display, in conjunction with the face-recognition module recognizing the features of the face, indications of the recognized features of the face on a rendering of the face, and further configured to display near the rendering of the face an indication of progress of the recognizing of features of the face by the face-recognition module.

Alternatively or in addition to any of the above described computing devices, any one or combination of: wherein the image capture device comprises an infra-red camera; wherein the image capture device comprises an RGB camera; wherein the display module is further configured to display the indication of progress of the recognizing of features of the face by rendering edges of a rectangle in which at least a portion of the face is located; wherein the display module is further configured to display the indications of the recognized features as dots on the rendering of the face next to at least one of: an eye, a nose, or a mouth of the face; wherein the image capture device is configured to obtain a video including the face, and the display module is configured to play back the video as the rendering of the face.

A computing device comprising: a processor; and a computer-readable storage medium having stored thereon multiple instructions that, responsive to execution by the processor, cause the processor to: obtain an image of a face; commence a face-recognition algorithm that recognizes multiple features of the face; in conjunction with recognizing one of the multiple features of the face, display an indication of the recognized feature on a rendering of the face; and display an indication of progress of the face-recognition algorithm near the rendering of the face.

Alternatively or in addition to any of the above described computing devices or systems, any one or combination of: wherein to obtain the image comprises to obtain the image via an RGB camera, wherein the multiple instructions further cause the processor to obtain an infra-red image of the face, wherein the face-recognition algorithm recognizes multiple features of the face, and wherein the rendering of the face is rendering of the image obtained via the RGB camera; wherein to display an indication of progress of the face-recognition algorithm comprises to render edges of a rectangle in which at least a portion of the face is located; wherein to display an indication of progress of the face-recognition algorithm comprises to fill in edges of a rectangle around at least a portion of the face; wherein to display an indication of the recognized feature on a rendering of the face comprises to display a graph that substantially covers the face in the rendering of the face; wherein to obtain the image of the face comprises to obtain a video including the face, and wherein to render the face comprises to play back the video while the face-recognition algorithm recognizes features of the face.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
    obtaining an image of a face;
    commencing a face-recognition algorithm that recognizes features of the face;
    in conjunction with recognizing the features of the face, displaying an indication of one or more of the features on a rendering of the face; and displaying, prior to completion of the rendering, a progressive indicator indicating progress for facial recognition processing of the face, wherein the displaying presents the progressive indicator overlaying a portion of the rendering.

2. The method of claim 1, wherein obtaining the image comprises obtaining the image via an infra-red camera.

3. The method of claim 1, wherein obtaining the image comprises obtaining the image via an RGB camera.

4. The method of claim 1, wherein the displaying of the progressive indicator comprises displaying a graph that covers at least a threshold percentage of the face in the rendering of the face; and transitioning, in response to at least a threshold number of the one or more features of the face being recognized, from displaying the graph to displaying the indication of the one or more features on the rendering of the face, and wherein the transitioning including ceasing displaying the graph.

5. The method of claim 1, wherein displaying of the indication of the one or more features on the rendering of the face comprises displaying one or more dots on the rendering of the face next to at least one of: an eye, a nose, or a mouth of the face.

6. A system comprising:
an image capture device configured to obtain an image of a face of a user of the system;
a face-recognition module including multiple instructions executed to recognize features of the face; and
a display module including multiple instructions executed to display an indication of one or more recognized features of the face on a rendering of the face, and further configured to display, prior to completion of the rendering, a progressive indicator indicating progress for facial recognition processing of the face, wherein the display module presents the progressive indicator overlaying a portion of the rendering.

7. The system of claim 6, wherein the image capture device comprises an infra-red camera.

8. The system of claim 6, wherein the image capture device comprises an RGB camera.

9. The system of claim 6, wherein the display module further includes instructions executed that displays the progressive indicator by rendering edges of a rectangle in which at least a portion of the face is located.

10. The system of claim 6, wherein the display module further includes instructions executed that displays the indication of the one or more recognized features as dots on the rendering of the face next to at least one of: an eye, a nose, or a mouth of the face.

11. The system of claim 6, wherein the image capture device is configured to obtain a video including the face, and the display module is configured to play back the video as the rendering of the face.

12. A computing device comprising:
a processor; and
a computer-readable storage medium having stored thereon multiple instructions that, responsive to execution by the processor, cause the processor to:
obtain an image of a face;
commence a face-recognition algorithm that recognizes features of the face;
display an indication of one or more features on a rendering of the face; and
display, prior to completion of the rendering, a progressive indicator indicating progress for facial recognition processing of the face, wherein the progressive indicator is presented overlaying a portion of the rendering.

13. The computing device of claim 12, wherein to obtain the image comprises to obtain the image via an RGB camera, wherein the multiple instructions further cause the processor to obtain an infra-red image of the face, wherein the face-recognition algorithm recognizes multiple features of the face, and wherein the rendering of the face is rendering of the image obtained via the RGB camera.

14. The computing device of claim 12, wherein to display an indication of progress of the face-recognition algorithm comprises to render edges of a rectangle in which at least a portion of the face is located.

15. The computing device of claim 12, wherein the display of the progressive indicator comprises operations that fill in edges of a rectangle around at least a portion of the face.

16. The computing device of claim 12, wherein the display of the progressive indicator comprises displaying a graph that covers at least a threshold percentage of the face in the rendering of the face; and transitioning, in response to at least a threshold number of the one or more features of the face being recognized, from display of the graph to display of the indication of the one or more features on the rendering of the face, and wherein the transition including ceasing display of the graph.

17. The computing device of claim 12, wherein to obtain the image of the face comprises to obtain a video including the face, and wherein to render the face comprises to play back the video while the face-recognition algorithm recognizes features of the face.

18. The method of claim 1, further comprising: automatically removing, from display, the progressive indicator upon completion of the rendering of the image.

19. The method of claim 1, wherein the displaying of the progressive indicator comprises rendering the progressive indicator as a progressively updated geometric shape, and wherein a display state of the progressively updated geometric shape is correlated with a state of completion of the facial recognition processing.

20. The method of claim 1, wherein the progressive indicator is a progress bar, and wherein the displaying fills the progress bar as indication of a state of completion of the facial recognition processing.

\* \* \* \* \*